July 6, 1965 W. G. KINGMA 3,193,257
DEVICE FOR MIXING A LIQUID WITH ANOTHER
LIQUID OR A GASEOUS FLUID
Filed Oct. 4, 1962

INVENTOR
WOUTER G. KINGMA

BY *Truvie and Smiley*

ATTORNEYS 3,193,257
DEVICE FOR MIXING A LIQUID WITH ANOTHER LIQUID OR A GASEOUS FLUID
Wouter G. Kingma, Huizen, Netherlands, assignor to Werkspoor N.V., Amsterdam, Netherlands, a company of the Netherlands
Filed Oct. 4, 1962, Ser. No. 228,470
Claims priority, application Netherlands, Oct. 23, 1961, 270,509
3 Claims. (Cl. 259—4)

This invention relates to a device for mixing a liquid with another liquid or a gaseous fluid, in which said first liquid flows through a conduit, having a local narrowing and being widened behind said narrowing and the conduit for said other fluid to be mixed with said first liquid being connected to said first conduit at the narrowing therein.

The invention has for its object to improve a device of this kind in such a manner that an intimate mixture of both fluids may be obtained in a very short time. According to the invention the narrowing of the conduit for the liquid is constituted by an annular collar provided at the inner wall of the conduit, said collar at its inner side being conically widened and a slot to which a conduit for the liquid or gaseous fluid to be mixed with said first liquid is connected, opening at the inner wall of said collar in such a manner that the fluid flows out transversely to the flow of liquid in said first conduit. At said annular collar and also behind said collar turbulences are generated in the liquid flowing through the conduit and thereby the fluid flowing out of the slot at the circumference of the flow of liquid is intimately mixed with the liquid and dispersed in said liquid.

The device according to the invention may be used for mixing a liquid with any suitable fluid and is also adapted for heating a liquid by means of steam without causing noise and shocks, whereby the steam is blown into the liquid and is mixed with the liquid and transmits its heat of condensation to the liquid.

The device according to the invention is particularly adapted for mixing water or an aqueous liquid with a starch suspension for treating starch. In such a process the aqueous liquid has a temperature of about 150° to 160° C. and the starch particles entering into the liquid with a temperature of e.g. 40° to 50° C. should rapidly pass through the gelatinous phase for preventing the formation of lumps, so that a very fine dispersion of the starch in the aqueous liquid is obtained which is of great importance.

Figure 1:
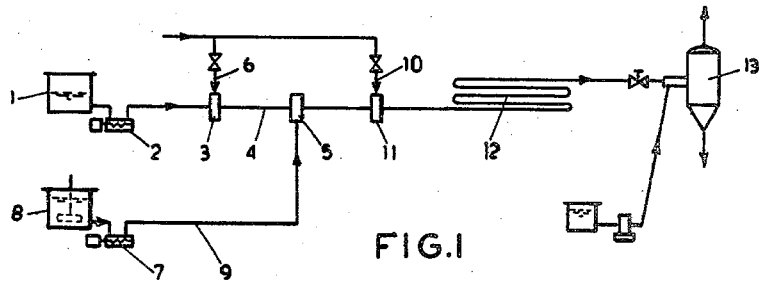

In the drawing in which an embodiment of a device according to the invention is illustrated, FIG. 1 is a diagrammatical view of a plant for treating a starch suspension in which mixing devices according to the invention are provided.

Figure 2:
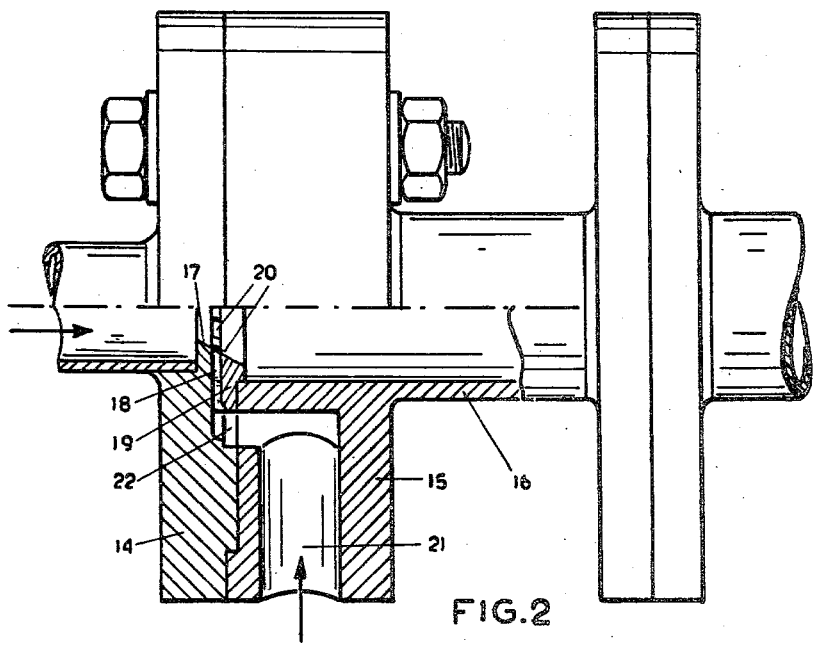
Figure 3:
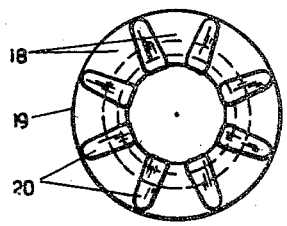

FIG. 2 is a view of the mixing device on a larger scale with partial longitudinal section and FIG. 3 is a side view of a body forming the slot.

With the plant shown in FIG. 1 water from a tank 1 by means of pump 2 is forced to a mixing device 5 through a conduit 4 and a steam blower 3, in which steam is blown through conduit 6. The tank 8 contains e.g. an acidified starch suspension of 22° Baumé and a pump 7 through conduit 9 forces suspension from tank 8 to the mixing device 5. The mixture obtained in the mixing device 5 subsequently passes through a steam blower 11, in which steam is blown through a conduit 10 for heating the mass to the desired temperature. The mass thereafter flows into a reactor 12, and subsequently enters a flash evaporator 13, in which a low pressure is maintained, so that the mass is rapidly cooled down to the desired temperature by self-evaporation.

The mixing device 5 is constituted by two flanges 14 and 15 provided in conduit 4 and the flange 14 of which is united with an intermediate body 16. In the conduit a narrowing is formed by a projection 17 provided at the bore of the flange 14. Between the flanges 14, 15 a radial annular slot 18 is provided formed by a disk 19 clamped between the flanges and having radial projections 20 at its side facing the flange 14 and said projections interrupt the slot 18. The flange 15 has a radial bore 21, to which conduit 9 is connected and said bore communicates with an annular chamber 22 provided in flange 14, so that the starch suspension may enter into the slot 18 and is taken up in the turbulent flow at the narrowing 17 in the water in conduit 4. The parts 17 and 19 together form a collar providing a relatively thin disc-like baffle coaxial with and sharply constricting the bore of conduit 4 both at the entry and exit faces of the baffle. The bore of the baffle is conical, as shown in FIG. 2, and widens sharply from the upstream end face toward the downstream end face.

The steam blowers 3 and 11 may also be constructed in the manner according to FIG. 2, whereby the bore 21 is then connected to steam conduit 6 or 10. Such a steam blower may also be provided in the conduit 9 for heating the starch suspension.

Under particular conditions of operation a continuous uninterrupted slot 18 may be provided. Some short radial projections 20, however, may be required for obtaining a slot of a predetermined width.

What I claim is:

1. A device for mixing a liquid with another fluid, comprising a conduit for flow of a liquid, a thin collar coaxial with said conduit and having a thickness less than its diameter positioned at least partially within the conduit and projecting inwardly thereof to form an annular baffle sharply reducing the bore of the conduit, said collar having upstream and downstream end faces of which at least the upstream end face projects into the bore of the conduit to constrict the same, said end faces being substantially perpendicular to the axis of the conduit, a conical bore in said collar between said end faces which widens sharply toward the downstream end face, an annular slot in said collar, a duct for fluid to be mixed with liquid flowing through said conduit connected to said slot, and said annular slot opening into said conical bore to provide a passage for flow of fluid from said duct into the conical bore in a direction transverse to the flow of liquid in said conduit.

2. A device as claimed in claim 1, wherein said duct for fluid to be mixed with liquid flowing through said conduit has a portion completely surrounding and communicating with said slot about its periphery.

3. A device for mixing a liquid with another fluid as claimed in claim 1, wherein said slot is interrupted by a plurality of radial dams.

References Cited by the Examiner
UNITED STATES PATENTS
2,724,583    11/55    Targosh et al. _____ 239—434

MORRIS O. WOLK, *Primary Examiner.*